(12) United States Patent
Guo

(10) Patent No.: US 9,600,399 B2
(45) Date of Patent: Mar. 21, 2017

(54) CONTENT RECORDING METHOD AND DEVICE

(71) Applicant: Tencent Technology (Shenzhen) Company Limited, Guangdong (CN)

(72) Inventor: Zifeng Guo, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 59 days.

(21) Appl. No.: 14/659,872

(22) Filed: Mar. 17, 2015

(65) Prior Publication Data

US 2015/0186248 A1 Jul. 2, 2015

Related U.S. Application Data

(63) Continuation of application No. PCT/CN2013/083622, filed on Sep. 17, 2013.

(30) Foreign Application Priority Data

Sep. 19, 2012 (CN) .......................... 2012 1 0348744

(51) Int. Cl.
*G06F 11/36* (2006.01)
*G06F 3/0481* (2013.01)

(52) U.S. Cl.
CPC ...... *G06F 11/3664* (2013.01); *G06F 3/04812* (2013.01); *G06F 3/04817* (2013.01); *G06F 11/3672* (2013.01)

(58) Field of Classification Search
CPC .............. G06F 11/3664; G06F 11/3672; G06F 3/04812; G06F 3/04817
See application file for complete search history.

(56) References Cited

U.S. PATENT DOCUMENTS 5,335,342 A * 8/1994 Pope .................. G06F 11/3672
714/38.13
6,237,138 B1 * 5/2001 Hameluck .............. G06F 11/34
702/182
7,114,018 B1 * 9/2006 Maity ..................... G06F 3/023
345/163

(Continued)

OTHER PUBLICATIONS

Lavrov, V., Screen recording system for the Windows desktop, The 8th Russian-Korean International Symposium on Science and Technology, 2004, 3 pages, [retrieved on Nov. 14, 2016], Retrieved from the Internet: <URL:http://ieeexplore.ieee.org/>.*

(Continued)

*Primary Examiner* — Geoffrey St Leger
(74) *Attorney, Agent, or Firm* — Frommer Lawrence & Haug LLP; William S. Frommer

(57) ABSTRACT

Disclosed are a content recording method and device, for use in software development. The method includes: capturing the content displayed on a screen in the software development process; acquiring a mouse event related to the content displayed on the screen; and processing the mouse event and the content displayed on the screen to obtain the recorded content, the recorded content containing the content displayed on the screen and the mouse event. The technical solution can record a screen capture and a mouse/keyboard operation related thereto in the software test development process, thus effectively recording the test and development process, and improving test and development efficiency.

14 Claims, 5 Drawing Sheets

(56) References Cited

U.S. PATENT DOCUMENTS

| | | | | |
|---|---|---|---|---|
| 2002/0087950 A1* | 7/2002 | Brodeur | G06F 11/3636 | 717/124 |
| 2006/0253741 A1* | 11/2006 | Garakani | G06F 11/3692 | 714/38.11 |
| 2008/0141221 A1* | 6/2008 | Benesovska | G06F 11/3688 | 717/124 |
| 2008/0229206 A1* | 9/2008 | Seymour | G06F 3/0481 | 715/727 |
| 2008/0282160 A1* | 11/2008 | Tonnison | G06F 9/4443 | 715/704 |
| 2009/0150868 A1* | 6/2009 | Chakra | G06F 11/3692 | 717/125 |
| 2009/0161949 A1* | 6/2009 | Milov | G06F 11/3664 | 382/162 |
| 2009/0228789 A1* | 9/2009 | Brugler | G06F 11/3664 | 715/700 |
| 2010/0205530 A1* | 8/2010 | Butin | G06F 9/4446 | 715/715 |
| 2012/0013607 A1* | 1/2012 | Lee | G06T 15/20 | 345/419 |
| 2012/0131456 A1* | 5/2012 | Lin | G06F 9/4443 | 715/704 |
| 2013/0106698 A1* | 5/2013 | Zhang | G06F 3/04812 | 345/163 |
| 2013/0145294 A1* | 6/2013 | Thiruvillamalai | G06F 11/3672 | 715/764 |
| 2013/0290875 A1* | 10/2013 | Dixit | G06F 11/3664 | 715/760 |
| 2015/0074648 A1* | 3/2015 | Tal | G06F 11/3688 | 717/124 |

OTHER PUBLICATIONS

Pitkanen, J., et al., Usability Testing in Real Context of Use: the User-Triggered Usability Testing, Proceedings of the 7th Nordic Conference on Human-Computer Interaction: Making Sense Through Design, 2 pages, [retrieved on Nov. 14, 2016], Retrieved from the Internet: <URL:http://dl.acm.org/>.*

* cited by examiner

CONTENT RECORDING METHOD AND DEVICE

CROSS-REFERENCE TO RELATED APPLICATIONS

This present application is a Continuation Application of PCT Patent Application No. PCT/CN2013/083622, filed on Sep. 17, 2013, which claims the benefit of priority to Chinese Patent Application No. 201210348744.3, filed on Sep. 19, 2012 and entitled "CONTENT RECORDING METHOD AND DEVICE", the contents of which are hereby incorporated by reference in their entireties for all intended purposes.

FIELD

The disclosure relates to a field of computer software development, and particularly to, a content recording method and a device.

BACKGROUND

With the continuous development of Internet software, application software in multiple types and functions has been developed. Nowadays, a software tester usually tests the function of application software manually.

However, for some application software, particularly for game application software, when a use case is executed (e.g., testing an execution step of a certain function and examining an expected result), due to complicated operation steps and close logical associations between inside modules of the software, when a bug is discovered by the tester, descriptions of the bug and illustrations of each operation step related to the bug from the tester often cannot make a developer understand the bug correctly and effectively. Namely, the developer may describe the recurrence of development process in words, but a reader can not accurately and quickly understand what actually happened and how it happened. For the above reason, a communication with the developer may still be required; in some instances, a recurrence presentation may be required sometimes, even more. In particular, it is not necessary for some bugs to recur regularly, which means that the same bug may not recur by executing each operation step related to the bug described by the tester. If the bug cannot quickly recur, the development efficiency may be reduced.

In addition, for some outsourcing test tasks, because of higher communication costs, the bug descriptions in words and speech may be unclear; due to geographical restrictions, it is unlikely for the tester to demonstrate the bug at the development site. Thus, a new technology may be required for assisting the tester to better describe the software development process.

SUMMARY

Embodiments of the present disclosure provide a content recording method and a device, which can record a screen capture and a mouse/keyboard operation during a software test and a development process, thereby effectively recording the software test and development process and improving test and development efficiency.

According to one aspect of the present disclosure, a content recording method is provided, which is applied for the software development, the method can include the following steps of:

capturing a screen displaying content in a software development process, wherein the screen displaying content is a content displayed on a screen;

acquiring a mouse event related to the screen displaying content; and processing the mouse event and the screen displaying content to obtain a recorded content, wherein the recorded content includes the screen displaying content and the mouse event.

According to another aspect of the present disclosure, a content recording device is also provided, which is applied for the software development, the device can include:

a capturing module, configured to capture a screen displaying content in a software development process;

an event module, configured to acquire a mouse event related to the screen displaying content; and a recording module, configured to process the mouse event and the screen displaying content to obtain a recorded content, wherein the recorded content includes the screen displaying content and the mouse event.

In one embodiment of the present invention, a screen displaying content and a relative mouse/keyboard operation during the software development process can be recorded in real time, and a playable file can be generated. It can make other people completely and comprehensively understand every detail in the software development process by playing the playable file, and thus, the software development efficiency can be improved.

BRIEF DESCRIPTION OF THE DRAWINGS

In order to illustrate the embodiments or existing technical solutions more clearly, a brief description of drawings that assists the description of embodiments of the invention or existing art will be provided below. It would be apparent that the drawings in the following description are only for some of the embodiments of the invention. A person having ordinary skills in the art will be able to obtain other drawings on the basis of these drawings without paying any creative work.

DETAILED DESCRIPTION OF ILLUSTRATED EMBODIMENTS

Further description of present disclosure will be illustrated clearly and completely, which combined with embodiments in drawings and detailed embodiments. Obviously, the embodiments here are not all embodiments but only part of embodiments of present disclosure. Based on the embodiments of present disclosure, under premise of without paying out creative work, other embodiments obtained by the person having ordinary skill in the art are considered to encompass within the scope of the present invention.

In the existing technology, since different problems which occur in the software development process can only recur by a tester using words, speech or a like manner, so lots of extra work may be brought to the tester by the manners above, and meanwhile the requirement for the communication skill of the tester can be relatively high. In practical test process, due to being limited to the ability of the tester, the effective communication for the test problem usually may not be performed well.

On the basis of the above-mentioned problems, embodiments of present disclosure aim to provide a method and a tool which can effectively record the software development process performed by a tester, and thus all kinds of problems, adopted means, etc. during the software development can be effectively recorded, to replace communication and expression of the tester.

Figure 1:
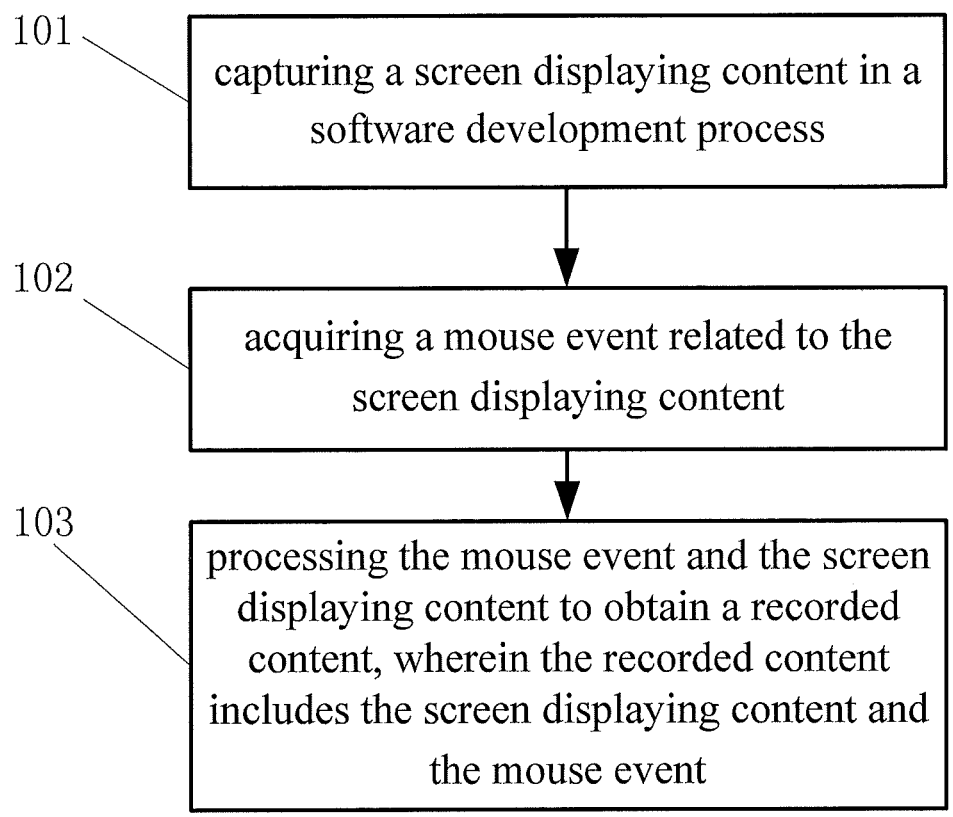
FIG. 1 is a flowchart of a content recording method according to an embodiment of the present disclosure.

An embodiment of present disclosure provides a content recording method as shown in FIG. 1. The content recording method can include the following steps.

Step 101, capturing a screen displaying content in a software development process. Wherein the screen displaying content is the content displayed on a screen. When the screen displaying content needs to be captured, it can be captured once at a preset time interval. A specific capturing method can refer to a solution which is applied to any of various capturing tools. A captured screen displaying content (namely, a screen displaying content that has been captured) can be stored as an image file having one or more than one image formats, such as an image file having a JPG format.

Step 102, acquiring a mouse event related to the screen displaying content. During a capturing process, the mouse event can be a mouse stay or a movement operation on the screen, or a mouse click operation, etc. A keyboard event can also be a key pressing operation on a keyboard during the capturing process, such as pressing the ENTER key, pressing the letter key of "C", pressing the keys of "ctrl" and "C" simultaneously, etc.

For example, when the software development is a game development using a touchscreen, generally, only a mouse click operation may be performed, and each click operation of a left mouse button can be recorded.

The step 101 and the step 102 will be not necessarily in order therebetween. During the capturing process, when a certain screen is on display, some certain mouse events may occur at the same time, and at this time, the screen displaying content and the mouse event can be obtained in real time.

Step 103, processing the mouse event and the screen displaying content to obtain a recorded content, wherein the recorded content includes the screen displaying content and the mouse event.

For example, in this step, the mouse event can be converted into a visible icon, and the visible icon can be inserted into a corresponding location in the corresponding screen displaying content, and the screen displaying content can be stored as a playable image file. It may be obvious that after the playable image file is generated, and the screen displaying content obtained by capturing the screen can be deleted.

For instance, when a mouse event is a mouse click operation, in the present step, a normal mouse icon in the screen displaying content which is captured when the mouse click operation happens can be converted into an enlarged mouse icon, and the enlarged mouse icon can be used to cover the normal mouse icon in the screen displaying content. An icon having a different color can also be applied for indication, that is, the normal mouse icon in the screen displaying content which is captured when the mouse click operation happens can be converted into a highlighted color mouse icon, and the highlighted color mouse icon can be used to cover on the normal mouse icon in the screen displaying content. It may be obvious that a distinguished pattern can be added beside the icon for indication, such as an underline, a circle, etc.

While in this screen capture, the enlarged mouse icon (or other above-mentioned icons) can suggest that a mouse click operation has happened at the moment. In one embodiment of the present disclosure, different kinds of mouse and keyboard events can be defined as different visible icons for ease for indentifying the mouse and keyboard events, and the different kinds of mouse and keyboard events can be reflected in the screen capture.

On the other hand, when the screen displaying content which is processed by inserting the visible icon needs to be stored, it can be compressed. That is, in the present step, the image file can be obtained by processing the mouse event and the screen displaying content and the recorded content can be obtained by compressing the image file.

It may be obvious that the image file can be made into a playable image file, and the playable image file can play the screen displaying content in a time interval longer than a preset time period. That is, for a clear reaction of every situation in the process of software development, a play speed of the playable image file can be set to be less than a screen capturing speed of the screen. The playable image file can be a file having graphic interchange format (GIF).

Figure 2:
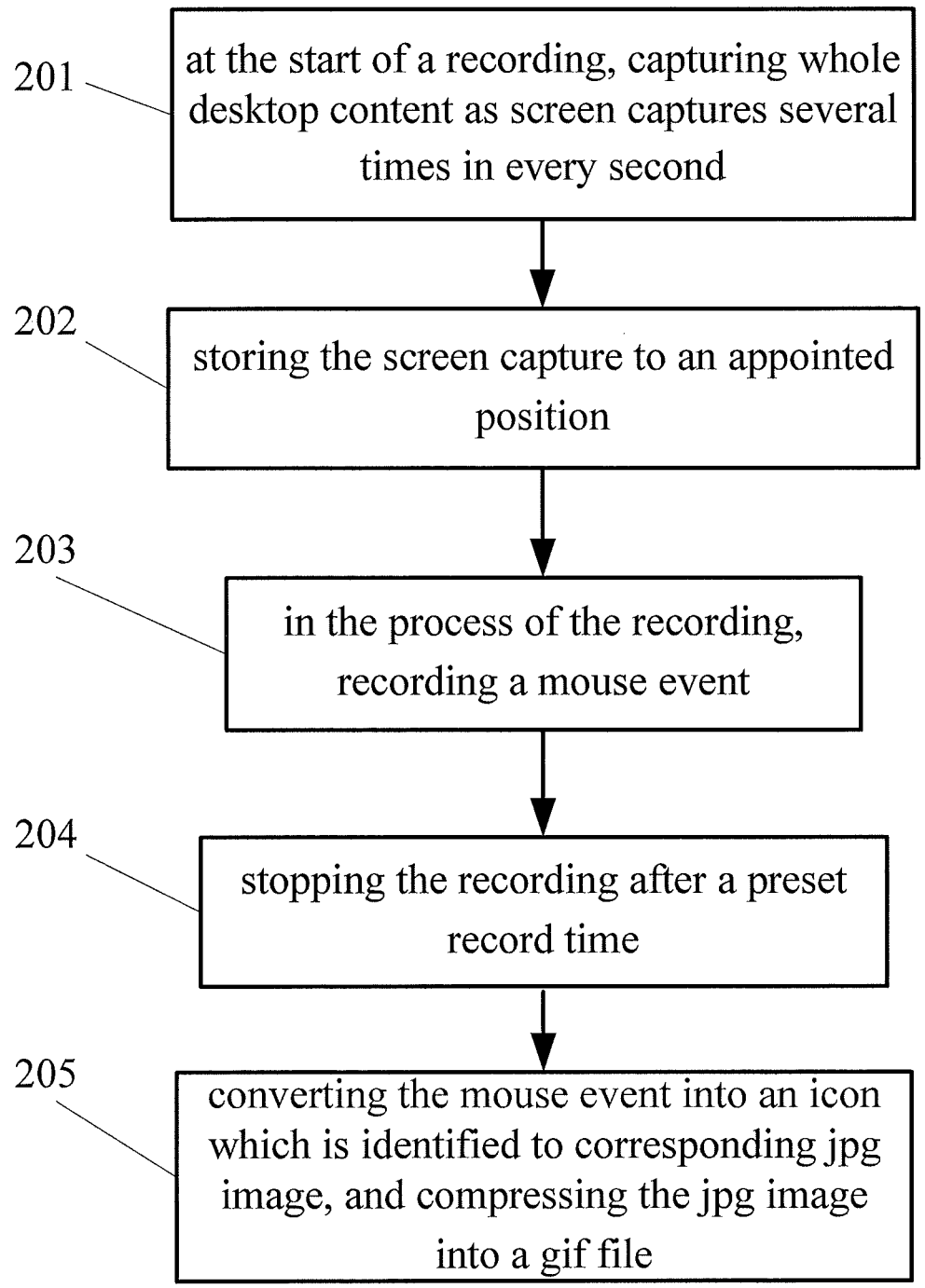
FIG. 2 is a flowchart of a content recording method according to another embodiment of the present disclosure.

Referring to FIG. 2, FIG. 2 illustrates a content recording method in detail according to another embodiment of the present disclosure. In the embodiment, the content recording method can be realized by an application program coded in Java. The method can include the following steps.

Figure 3:
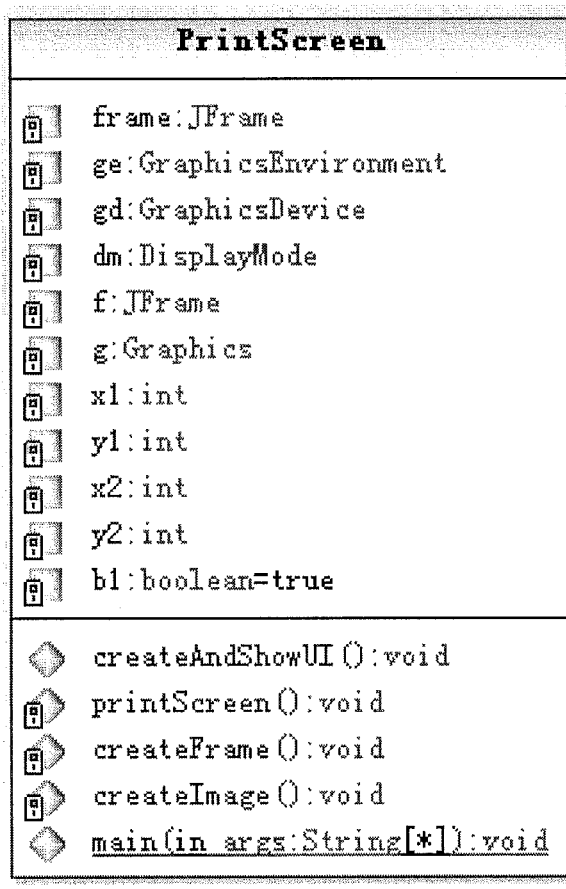
FIG. 3 is a schematic diagram of a screen capture according to an embodiment of the present disclosure.

Step 201, at the start of a recording, capturing whole desktop content as screen captures several times in every second. If two displays exist, only the desktop content of a main display of the two displays can be captured as a recorded content. For example, the screen capture of the whole desktop content can be captured once at every 200 milliseconds (ms). Referring to FIG. 3, it is a schematic diagram of an obtained screen capture. Meanwhile, during the process of recording the desktop content, mouse locations can be recorded in the screen capture, and when a mouse click operation is performed, the mouse icon can be enlarged.

Step 202, storing the screen capture to an appointed position. For example, each screen capture can be stored to a memory in the form of jpg format.

Figure 4:
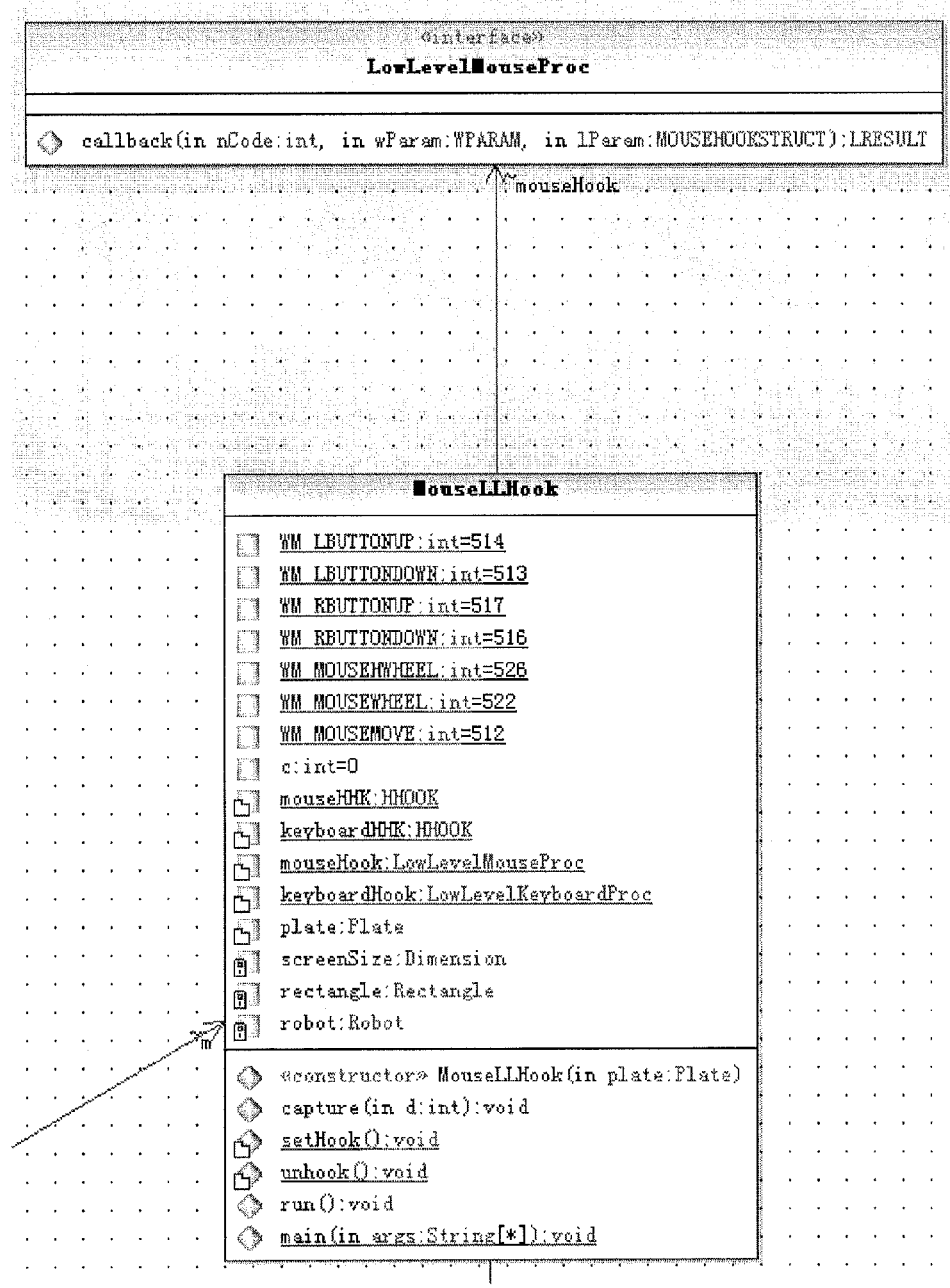
FIG. 4 is a schematic diagram of a program document for monitoring and processing a mouse and a keyboard event in an application program coded in Java according to an embodiment of the present disclosure.

Step 203, in the process of the recording, recording a mouse event. The present step and the above-mentioned process for capturing a certain screen capture can be performed simultaneously. Referring to FIG. 4, it is a schematic diagram of a program document for monitoring and processing a mouse and a keyboard event in an application program coded in Java.

Step 204, stopping the recording after a preset record time. For example, the preset record time can be controlled within 15 minutes, or the recording can also be ended manually.

Figures 5, 6:
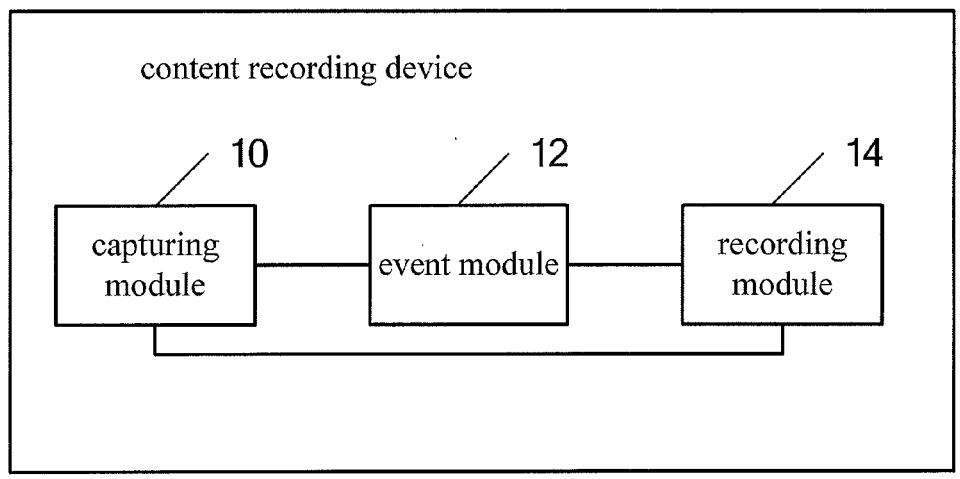
FIG. 5 is a schematic diagram of a program document for compressing image in an application program coded in Java according to an embodiment of the present disclosure.
FIG. 6 is a structure diagram of a content recording device according to an embodiment of the present disclosure.

Step 205, converting the mouse event into an icon which is identified to corresponding jpg image, and compressing the jpg image into a gif file. The gif file can be named as: "trace"+record starting time. gif. Referring to FIG. 5, it is a schematic diagram of a program document for compressing image in an application program coded in Java. Particularly, the time interval of playing each image of the gif file can be set as 500 ms, which thus can achieve the result of slowly playing the recording.

In a concrete implementation, a Jar package can be generated after the application program is coded in Java, and it can be deployed to a computer which performs the software development. The computer can be a platform of Windows operating system. After the application program starts up, a whole desktop content can be captured once at every 200 ms to obtain the screen captures which can be stored to a specified directory. After the recording ends, the application program can compress, in a time interval of 500 ms, each image into a gif file which can be directly played, which thus can achieve the result of slowly playing the recording. The mouse locations can be recorded in each screen capture, if a mouse click operation is performed, the mouse icon can be repainted to obtain an enlarged mouse icon, so as to indicate the mouse click operation. In the process of recording, a keyboard operation can also be recorded.

Referring to FIG. 6, it is a specific composition diagram of a content recording device in an embodiment of the present disclosure. The content recording device can be applied for software development, and it can at least include: a capturing module 10, configured to capture a screen displaying content in a software development process, wherein the screen displaying content is the content displayed on a screen; an event module 12, configured to acquire a mouse event related to the screen displaying content; and a recording module 14, configured to process the mouse event and the screen displaying content to obtain a recorded content, wherein the recorded content includes the screen displaying content and the mouse event.

According to one embodiment of present disclosure, the capturing module 10 can be further configured to capture the screen displaying content once at a preset time interval.

According to one embodiment of present disclosure, the recording 12 can be further configured to convert the mouse event into a visible icon, insert the visible icon into a corresponding location in the corresponding screen displaying content, and store the screen displaying content as a playable image file. For example, the screen displaying content can be stored as a playable image file, which plays the screen displaying content in a time interval longer than a preset time period.

Particularly, the recording module 12 can also process the mouse event and the screen displaying content to obtain the image file, and compress the image file to obtain a recorded content. Specifically, the compressed image file can be made into the above-mentioned playable image file, and also it can only be stored in a file folder.

According to one embodiment of present disclosure, when the mouse event is a mouse click operation, the recording module 12 can be further configured to convert a normal mouse icon in the screen displaying content which is captured when the mouse click operation happens into an enlarged mouse icon, cover the enlarged mouse icon on the normal mouse icon in the screen displaying content; or convert the normal mouse icon in the screen displaying content which is captured when the mouse click operation happens into a highlighted color mouse icon, cover the highlighted color mouse icon on the normal mouse icon in the screen displaying content.

The terms and function definitions in the device embodiments can be consistent with the above-mentioned method embodiments, and which would not be repeatedly described herein.

According to one embodiment of the present disclosure, a screen displaying content and a related mouse/keyboard operation during the software development process can be recorded in real time, and a playable file can be generated. Thus, other people can completely and comprehensively understand every detail in the software development process by playing the playable file, and thereby improving the software test and development efficiency.

According to an embodiment of present disclosure, the content recording method as shown in FIG. 2 can be executed by corresponding modules in the content recording device as shown in FIG. 6. For example, the steps 101-103 shown in FIG. 2 can be executed by the capturing module 10, the event module 12 and the recording module 14 as shown in FIG. 6.

According to another embodiment of present disclosure, each unit in the content recording device as shown in FIG. 6 can be separately or all combined into one or a plurality of other units, or a certain (some) unit(s) can also be divided into multiple units in functions. For example, but not limited to, the capturing module 10 can be divided into two individual units, one for capturing the whole desktop content, and the other for storing the desktop capture; the event module 12 can be divided into two individual units, one for recording the mouse event, and the other for stopping the recording after a preset record time. Thus, based on the above-described, the same operation can be realized, without influencing the realization of the technical effect of the embodiments of the present disclosure.

A person having ordinary skills in the art can realize that part or whole of the processes in a content recording method according to an embodiment as shown in FIG. 2. By a computer program (including a program code) instructing relevant hardware, such as a central processing unit (CPU), or a like processing element, a content recording device as shown in FIG. 6 can be implemented, and a content recording method according to an embodiment of present disclosure can be realized. The program may be stored in a computer readable storage medium. When executed, the program may execute processes in the above-mentioned embodiments of methods. The storage medium may be a magnetic disk, an optical disk, a Read-Only Memory (ROM), a Random Access Memory (RAM), et al.

The above descriptions are some exemplary embodiments of the invention, and should not be regarded as limitation to the scope of related claims. A person having ordinary skills in a relevant technical field will be able to make improvements and modifications within the spirit of the principle of the invention. The improvements and modifications should also be incorporated in the scope of the claims attached below.

What is claimed is:

1. A content recording method, comprising the steps of:
   capturing a screen displaying content in a software development process, wherein the screen displaying content is a content displayed on a screen;
   acquiring a mouse event related to the screen displaying content; and
   processing the mouse event and the screen displaying content to obtain a recorded content, comprising: converting the mouse event into a visible icon, inserting the visible icon into a corresponding location in the corresponding screen displaying content, storing the screen displaying content processed by inserting the visible icon as a playable image file, comprising the steps of:
   when the mouse event is a mouse click operation, converting a normal mouse icon in the screen displaying content which is captured when the mouse click operation happens into an enlarged mouse icon; and covering the enlarged mouse icon on the normal mouse icon in the screen displaying content; and deleting the screen displaying content obtained by capturing the screen after the playable image file is generated;

wherein the recorded content includes the screen displaying content and the mouse event.

2. The method according to claim 1, wherein the step of capturing a screen displaying content in a software development process, comprises the step of:

capturing the screen displaying content once at a preset time interval.

3. The method according to claim 1, wherein, when the mouse event is a mouse click operation, the steps of converting the mouse event into a visible icon and inserting the visible icon into a corresponding location in the corresponding screen displaying content, comprise the steps of:

converting the normal mouse icon in the screen displaying content which is captured when the mouse click operation happens into a highlighted color mouse icon, covering the highlighted color mouse icon on the normal mouse icon in the screen displaying content.

4. The method according to claim 3, wherein the step of storing the screen displaying content processed by inserting the visible icon as a playable image file, comprises the step of:

storing the screen displaying content processed by inserting the visible icon as a playable image file which plays the screen displaying content at a time interval longer than a preset time period.

5. The method according to claim 1, wherein the step of storing the screen displaying content processed by inserting the visible icon as a playable image file, comprises the step of:

storing the screen displaying content processed by inserting the visible icon as a playable image file which plays the screen displaying content at a time interval longer than a preset time period.

6. The method according to claim 1, wherein the step of processing the mouse event and the screen displaying content to obtain a recorded content, comprises the steps of:

processing the mouse event and the screen displaying content to obtain an image file; and compressing the image file to obtain the recorded content.

7. The method according to claim 6, wherein the step of storing the screen displaying content processed by inserting the visible icon as a playable image file, comprises the step of:

storing the screen displaying content processed by inserting the visible icon as a playable image file which plays the screen displaying content at a time interval longer than a preset time period.

8. A content recording device, which is applied for software development, comprising:

a memory storing a plurality of program codes; and a processor configured to execute the plurality of program codes for:

capturing a screen displaying content in a software development process;

acquiring a mouse event related to the screen displaying content; and processing the mouse event and the screen displaying content to obtain a recorded content, comprising: converting the mouse event into a visible icon, inserting the visible icon into a corresponding location in the corresponding screen displaying content, storing the screen displaying content processed by inserting the visible icon as a playable image file, comprising: converting a normal mouse icon in the screen displaying content which is captured when the mouse click operation happens into an enlarged mouse icon; and covering the enlarged mouse icon on the normal mouse icon in the screen displaying content; and deleting the screen displaying content obtained by capturing the screen after the playable image file is generated;

wherein the recorded content includes the screen displaying content and the mouse event.

9. The device according to claim 8, wherein the program codes are further executed for capturing the screen displaying content once at a preset time interval.

10. The device according to claim 8, wherein the program codes are further executed for converting the normal mouse icon in the screen displaying content which is captured when the mouse click operation happens into a highlighted color mouse icon, covering the highlighted color mouse icon on the normal mouse icon in the screen displaying content.

11. The device according to claim 10, wherein the program codes are further executed for storing the screen displaying content processed by inserting the visible icon as a playable image file which plays the screen displaying content at a time interval longer than a preset time period.

12. The device according to claim 8, wherein the program codes are further executed for storing the screen displaying content processed by inserting the visible icon as a playable image file which plays the screen displaying content at a time interval longer than a preset time period.

13. The device according to claim 8, wherein the program codes are further executed for processing the mouse event and the screen displaying content to obtain an image file; and compressing the image file to obtain the recorded content.

14. A non-transitory computer readable storage medium storing a computer program comprising a program code, wherein, when the computer program runs on a computer, the program code executes the steps of:

capturing a screen displaying content in a software development process, wherein the screen displaying content is a content displayed on a screen;

acquiring a mouse event related to the screen displaying content; and processing the mouse event and the screen displaying content to obtain a recorded content, comprising: converting the mouse event into a visible icon, inserting the visible icon into a corresponding location in the corresponding screen displaying content, storing the screen displaying content processed by inserting the visible icon as a playable image file, comprising the steps of:

when the mouse event is a mouse click operation, converting a normal mouse icon in the screen displaying content which is captured when the mouse click operation happens into an enlarged mouse icon; and covering the enlarged mouse icon on the normal mouse icon in the screen displaying content; and deleting the screen displaying content obtained by capturing the screen after the playable image file is generated;

wherein the recorded content includes the screen displaying content and the mouse event.

* * * * *